H. G. BRAHMAN.
CHICKEN PERCH.
APPLICATION FILED MAR. 10, 1916.

1,210,592.

Patented Jan. 2, 1917.

WITNESSES
Frank C. Palmer.
J. E. Larsen

INVENTOR
H. G. Brahman
BY
ATTORNEYS

UNITED STATES PATENT OFFICE.

HERBERT G. BRAHMAN, OF READING, MICHIGAN.

CHICKEN-PERCH.

1,210,592.   Specification of Letters Patent.   Patented Jan. 2, 1917.

Application filed March 10, 1916. Serial No. 83,311.

*To all whom it may concern:*

Be it known that I, HERBERT G. BRAHMAN, a citizen of the United States, and a resident of Reading, in the county of Hillsdale and State of Michigan, have invented certain new and useful Improvements in Chicken-Perches, of which the following is a specification.

My invention relates to the care of poultry, and the main object thereof is to provide a thoroughly sanitary and vermin-proof perch and a floor thereunder for the reception of droppings and which may be angularly tilted for cleaning.

My invention is fully described in the following specification, of which the accompany drawings form a part, in which like characters refer to like parts in each of the views, and in which:—

Figure 1:
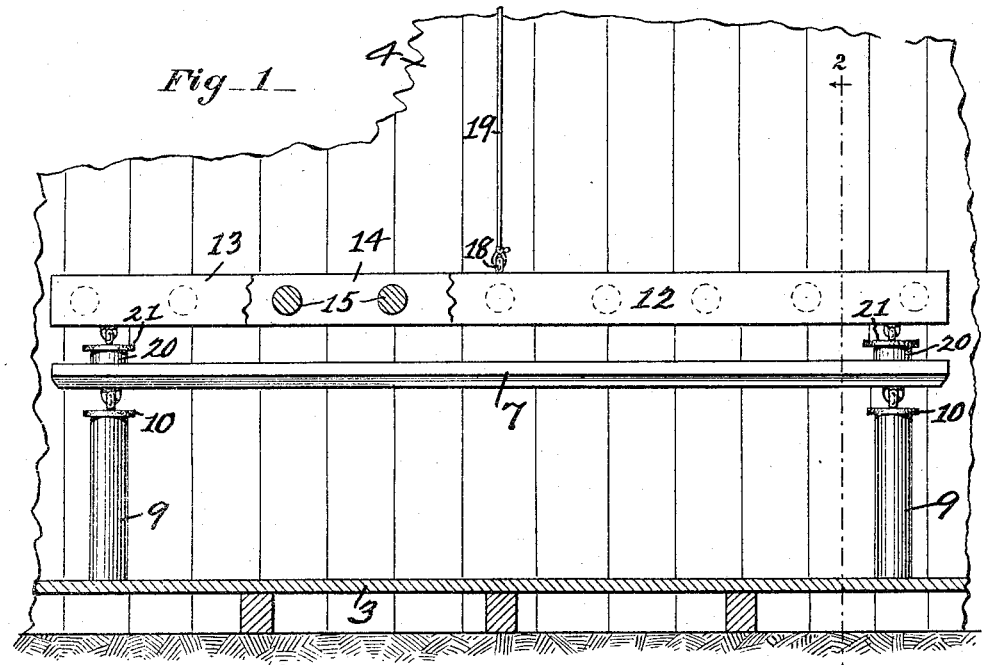
Figure 2:
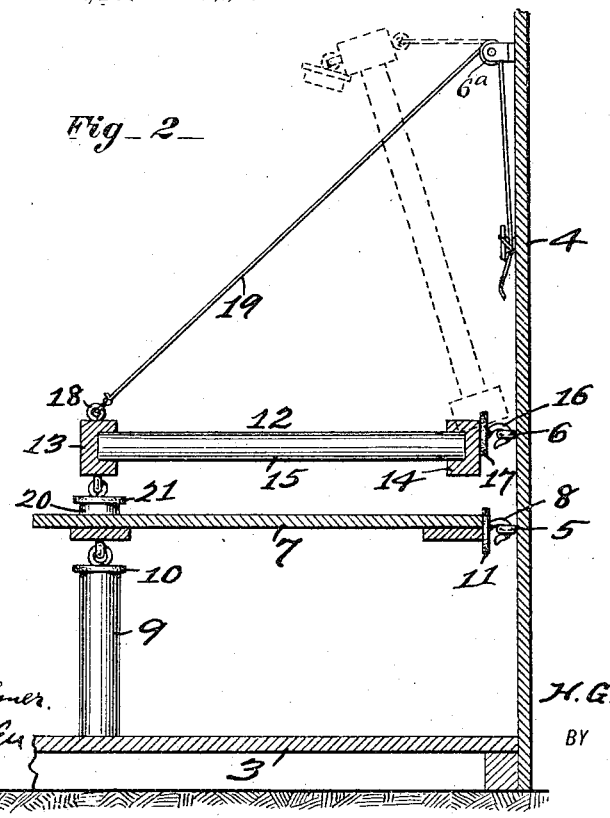

Figure 1 is a front view of my invention, partly broken away; and Fig. 2 is a section taken on the line 2—2 of Fig. 1.

Referring to the drawings, 3 represents the floor and 4 a wall of a chicken house, the latter being provided with a lower set of staples or screw-eyes 5 and an upper set 6 and a pulley 6ª is provided at a height above the upper set 6.

At 7 is shown the hinged floor for the reception of droppings, said floor having hooks 8 for engagement with the staples 5 and being provided with pivotally hung legs 9 at the forward edge, and I provide felt disks 10 at the upper ends of said legs and felt disks 11 in the positions of the hooks 8, these disks being saturated with a vermin repelling solution whereby lice and the like cannot reach the floor 7.

Above the floor 7 is the perch 12 formed of parallel strips 13 and 14 joined by rods 15 held within bores in the said strips, these bores not being through the strips in order to prevent breeding places for lice and the like. The strip 14 is provided with hooks 16 engaged with the staples 6 and I provide an absorbent disk 17 in the position of each hook 16 to prevent the passage of lice to the perch. The strip 13 is provided with a staple or screw-eye 18 to which a cable 19 is secured, said cable passing upwardly and being passed through the pulley 6ª whereby the perch 12 may be swung upwardly into the position indicated by dotted lines and thus facilitate the cleansing of the floor 7 which may also be swung on its pivots during the cleansing operation if desired.

From the foregoing it will be noted that no vermin can reach either the perch or the floor 7 from the floor or walls of the chicken house and, if any should be carried thereto by a chicken, no breeding places are presented nor hiding places for vermin.

As a further protection for the perch 12 I provide pivoted legs 20 resting upon the floor 7 and also provided with vermin repelling disks 21, these legs maintaining the desired relationship of the perch with the floor 7.

My invention is thoroughly sanitary, simple in construction and installation, entirely practical, and comparatively inexpensive.

While I have shown a preferred embodiment of the invention, I do not limit myself to the exact details but may make changes thereover provided such changes do not depart from the spirit of the invention and come within the scope of the appended claim.

Having fully described my invention, what I claim as new, and desire to secure by Letters Patent, is:—

The combination with the floor and wall of a chicken house, of a perch, a hook-and-eye connection between said perch and wall, a floor for droppings thereunder, a hook-and-eye connection between said floor for droppings and said wall, legs for said last named floor, legs for said perch, and a disk impregnated with vermin resisting material at the inner ends of said perch and last named floor and at the upper ends of said legs for preventing the passage of vermin to said perch and last named floor.

HERBERT G. BRAHMAN.

Witnesses:
 WILBUR D. GROMMON,
 J. CULVER RIGGS.

Copies of this patent may be obtained for five cents each, by addressing the "Commissioner of Patents, Washington, D. C."